United States Patent [19]

Taiani

[11] Patent Number: 4,896,064
[45] Date of Patent: Jan. 23, 1990

[54] LOW LOSS MAGNETIC DRIVE SYSTEM
[75] Inventor: Patrick M. Taiani, Bedford, Canada
[73] Assignee: Nova Scotia Research Foundation Corp., Nova Scotia, Canada
[21] Appl. No.: 293,106
[22] Filed: Jan. 3, 1989
[51] Int. Cl.$^4$ ............................................. H02K 49/10
[52] U.S. Cl. ..................................... 310/104; 310/92; 310/86
[58] Field of Search ................... 310/86, 92, 103, 104, 310/216, 217

[56] References Cited

U.S. PATENT DOCUMENTS

| | | | |
|---|---|---|---|
| 4,396,849 | 8/1983 | Taiani | 310/104 |
| 4,713,567 | 12/1987 | Fey et al. | 310/105 |
| 4,792,711 | 12/1988 | Smith, Jr. | 310/114 |

FOREIGN PATENT DOCUMENTS

1129469 8/1982 Canada .
1146207 3/1983 Canada .

Primary Examiner—Patrick R. Salce
Assistant Examiner—Judson H. Jones
Attorney, Agent, or Firm—Jones, Tullar & Cooper

[57] ABSTRACT

A low loss synchronous magnetic drive system for high pressure, high horsepower applications is disclosed. A carrier member driven by a drive motor carries spaced apart sets of drive magnets with the magnets of one set being of opposite polarity to the longitudinally aligned magnets of the other set. An output shaft carrying driven magnets oriented similarly to the drive magnets is also provided. A metallic hyperbaric barrier separates the drive and driven magnets. The barrier includes an outer cylinder having circumferentially spaced, radially directed, narrow slots extending therealong. Within the cylinder is a plurality of axially adjacent annular laminations insulated from each other. During operation the combination of the slotted cylinder, the laminations and the magnet arrangement keeps eddy currents generated in the barrier at a minimum, ensuring a high efficiency drive operable at speeds and pressures heretofore unattainable.

11 Claims, 8 Drawing Sheets

LOW LOSS MAGNETIC DRIVE SYSTEM

The present invention relates in general to magnetic drives for high pressure vessels and in particular to a low loss drive capable of transmitting high power at high speeds.

BACKGROUND OF THE INVENTION

There are many uses for vessels which may be required to withstand high internal pressures, say up to and even beyond 20,000 p.s.i., whether in the laboratory, industry or the military. One example is a decompression chamber for deep-sea divers, which chamber requires a power source to operate equipment therein, such as rotary gas pumps for circulating the breathing gas mixture through carbon dioxide scrubbers to remove the carbon dioxide. Another example is a high-pressure autoclave used to treat materials at upwards of 10,000 p.s.i. and which may require rotary equipment therein to circulate gases at the high pressures within the autoclave. It is not practical or safe to install electrical motors within such chambers and hence the drive for the rotary equipment for such devices must, perforce, be provided externally of the chambers. It is, of course, necessary to transfer power from a drive motor through the wall of the pressure chamber without permitting the escape of any pressurized gases from the chamber.

Magnetic drives have been used quite satisfactorily in the past to transfer power from a drive motor to rotary equipment within a high pressure chamber. Commonly assigned Canadian Patent Nos. 1,129,469 of Aug. 10, 1982 and 1,146,207 of May 10, 1983 illustrate two examples of prior art magnetic drives which successfully transfer power to high pressure chambers. Both patented devices are intended to keep eddy current losses and heat losses to a minimum during operation, but such devices are somewhat limited by the speeds at which they can operate and the power that they can transmit. They are also somewhat limited, therefore, as to the maximum pressures in which they can operate. The device of U.S. Pat. No. 1,129,469 is limited for example to speeds in the region of 5,000 to 7,000 R.P.M. by its belt drive configuration. There is now a definite need for magnetic drives which can operate at speeds in excess of 10,000 R.P.M. and in pressures of up to, and even beyond 20,000 p.s.i. without generating overly harmful, and wasteful, eddy currents.

SUMMARY OF THE INVENTION

Eddy current losses in a magnetic drive can be reduced significantly by using a hyperbaric laminated barrier between the drive and driven magnets, as taught in Canadian Patent No. 1,129,469. With a continuous cylindrical barrier excessive heating develops due to the rotating high energy magnetic field through currents induced in the barrier, even if the barrier is made from non-magnetic and high electrical volume resistivity steel. These induced currents (eddy currents) can be kept to a low value by sectionalizing the barrier into a number of electrically insulated, axially adjacent, laminations held together in compression as in the '469 Patent. The induced voltage is inversely proportional to the number of laminations and the resistance of the eddy current paths varies inversely with the cross-sectional area. Since the eddy current loss is defined by $E^2/R$, where E is the induced voltage and R is the resistance, it is seen that eddy current losses vary by the square of the number of equal laminations provided in the barrier. Thus an eddy current loss of 640 watts for a continuous barrier could be reduced to a loss of $640/1600=0.4$ watts for a barrier having 40 insulated laminations.

Another way of reducing eddy current losses while achieving higher working speeds and pressures is provided by the present invention. Instead of using axially adjacent sections or laminations the barrier of the present invention is sectionalized radially with a plurality of longitudinal, circumferentially spaced, narrow slots. The eddy current flow paths are then restricted to the longitudinal sections of the cylinder. Furthermore, to prevent electrical crossover at either end of the slotted cylinder or barrier the magnetic field is divided into at least two equal and opposite magnetic arrays so as to produce equal and opposite EMF's within each longitudinal section. This is achieved by using at least two sets of axially spaced apart drive and driven magnets with longitudinally adjacent and aligned magnets of each set being of opposite polarity.

In order to seal the interior of the drive system and to accommodate radial loads under pressure a plurality of annular laminations, electrically insulated from each other, is positioned within the slotted cylinder. Preferably the laminations are preloaded with an axially compressive force to improve the sealing capabilities. A compression ring or piston is used to apply the preload force and this piston is designed to have a larger effective pressure area relative to the sealing facial area of the laminations. The differences between these areas ensures that when the barrier is subjected to high internal pressures the laminations and their insulators will always be tightly clamped together with a force greater than the pressure forces acting to separate them.

With this invention the slotted tension cylinder is hermetically connected to the housing or apparatus containing the rotary machinery to be driven. A shaft carrying the driven magnets is bearingly supported within the cylinder, the shaft extending into the housing. A drive motor is directly coupled to a cup-shaped carrier member which encircles the cylinder and carries the drive magnets. By using the slotted cylinder, the axially separated sets of drive and driven magnets, and the internal laminations, the losses due to eddy current heating are kept remarkably low even at high rotational speeds. The benefits of the '469 Patent are achieved and the speed limitations thereof are not evident since drive belts are not used to couple the motor to the drive magnet carrier. Thus higher speeds can be attained and, consequently, smaller and more economical pumps or other rotary mechanisms can be driven by the shaft, resulting in further economies in construction Broadly speaking, therefore, the present invention provides a low loss synchronous magnetic drive system comprising: (a) a drive motor; (b) a cup-shaped carrier member coupled to the drive motor for rotation on a longitudinal axis, the member mounting therein at least two axially spaced apart sets of drive magnets, circumferentially adjacent magnets of each set being of opposite polarity and each magnet of one set being longitudinally aligned with a magnet of opposite polarity within the axially adjacent set; (c) a driven shaft rotatable on the axis, the shaft carrying thereon at least two axially spaced apart sets of driven magnets, each set being axially aligned with a corresponding set of the drive magnets, circumferentially adjacent driven magnets of each set being of opposite polarity, each driven magnet of one set being longitudinally aligned with a driven magnet of opposite polarity within the axially adjacent set; (d) tension cylinder means circumferentially interposed between the sets of drive and driven magnets, the cylinder means including a plurality of narrow, circumferentially equally spaced slots extending radially though the wall of the cylinder means over at least the combined length of the sets of driven magnets, the cylinder means having a closed wall at one end between the shaft and the carrier means and means at the other end for hermetically mounting the cylinder means to a housing containing apparatus to be driven by the shaft; and (e) a plurality of axially adjacent annular laminations electrically insulated from each other and positioned within the cylinder means so as to encircle the driven magnets over the length thereof; at least the driven shaft, the cylinder means and the laminations being constructed of non-magnetic materials having high tensile strength and high electrical volume resistivity.

The present invention will be described in greater detail hereinafter and with reference to the drawings provided herewith.

DESCRIPTION OF THE PREFERRED EMBODIMENT

Before discussing the present invention it is desirable to consider the benefits achievable with using laminations to reduce eddy current heating in hyperbaric barriers used in magnetic drive systems.

Figure 1A:
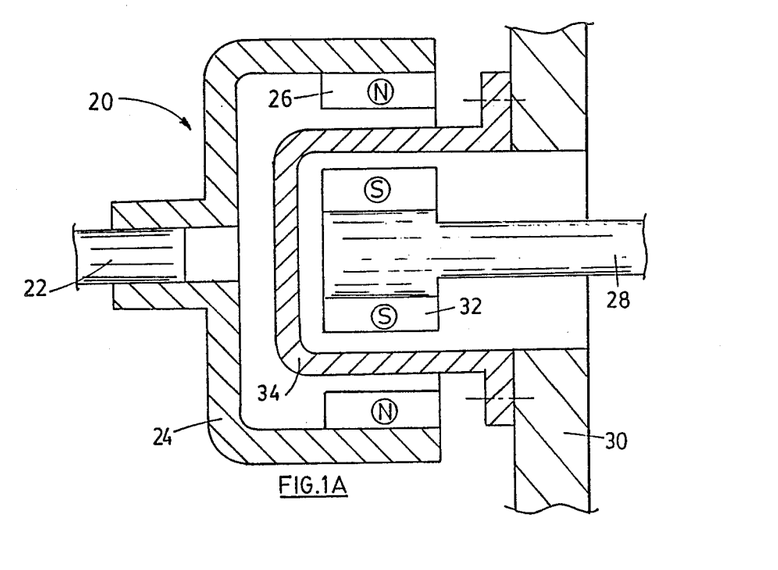
FIGS. 1A, 1B, 1C and 1D are intended to portray, schematically, the benefits of using laminations to reduce eddy current loss, as depicted in Canadian Patent No. 1,129,469.

FIG. 1A illustrates in its basic form a typical magnetic drive 20 including a shaft 22 coupled to a prime mover or drive motor (not shown) and having keyed thereto a cup-shaped carrier member 24. Member 24 mounts therein circumferentially spaced apart drive magnets 26 of alternate polarity. This system is intended to impart rotary motion to a driven or output shaft 28 which extends through a wall 30 of a vessel and which carries driven magnets 32. The drive and driven magnets 26, 32 are separated by a non-magnetic metallic cup-shaped barrier 34 which is hermetically sealed to the housing wall 30.

Figure 1B:
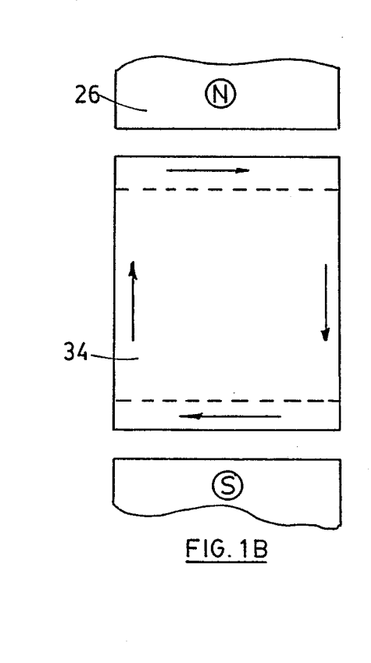
Figure 1C:
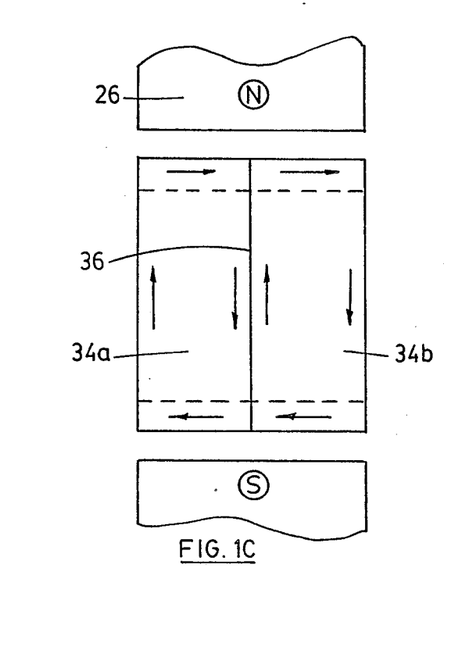
Figure 1D:
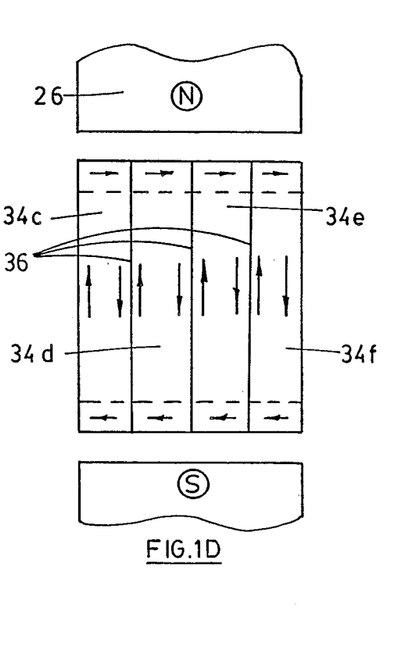

Turning now to FIG. 1B it is shown that a metal cylinder, such as barrier 34, placed in a rapidly rotating high energy magnetic field, would be subject to excessive heating due to induced electrical currents (eddy currents) illustrated by the arrows. If the cylinder 34 is sectioned into two halves 34a, 34b as in FIG. 1C with electrical insulation 36 therebetween the induced voltage in each section is halved and the resistance of the eddy current paths is doubled since resistance varies inversely with the cross-sectional area. Eddy current loss is defined by $E^2/R$ where E is the induced voltage (EMF) and R is the resistance. Thus eddy current losses vary by the square of the number of laminations that the cylinder is divided into. A system of FIG. 1B having a loss of 640 watts for example would show a loss of $640/4=160$ watts for a two section system of FIG. 1C. If the cylinder is sectioned into four laminations 34c to 34f as in FIG. 1D the loss would be $640/16=40$ watts. If the cylinder were sectioned into 40 laminations (not shown), the loss would be only $640/1600=0.4$ watts, a negligible amount. This principle was the basis for the invention of Canadian Patent No. 1,129,469.

As indicated previously there are advantages to be gained by avoiding the use of axially adjacent laminations and the consequent structure holding such laminations together as described in the '469 Patent. In particular it is very desirable to couple the drive motor directly to the drive magnet carrier so as to increase the rotational speed of the system. This was not possible with the '469 system.

It has now been recognized that the benefits of sectionalizing can be realized if the sectionalizing is done longitudinally rather than transversely. The barrier can then act as its own tension member avoiding the necessity of external tie bolts and thus the direct coupling of the drive motor to the drive magnets can be achieved. If the barrier, such as 34, is provided with circumferentially spaced, narrow, longitudinal slots the eddy currents will be restricted to the longitudinal sections of the barrier. However, other problems must be overcome. For example, to prevent electrical crossover of the induced EMF at each end of the cylinder or barrier it is necessary to produce equal and opposite EMF's in each longitudinal section. This is accomplished by dividing the magnetic field into at least two equal and opposite sections. Also it is necessary to protect the barrier against radial loads imposed by high internal pressures and it is necessary to ensure that there is no leakage of high pressure gases through the slots within the barrier itself. These problems are addressed hereinbelow and the solutions thereto are discussed with reference to FIGS. 2, 3, 4 and 4A to 4C.

Figure 2:
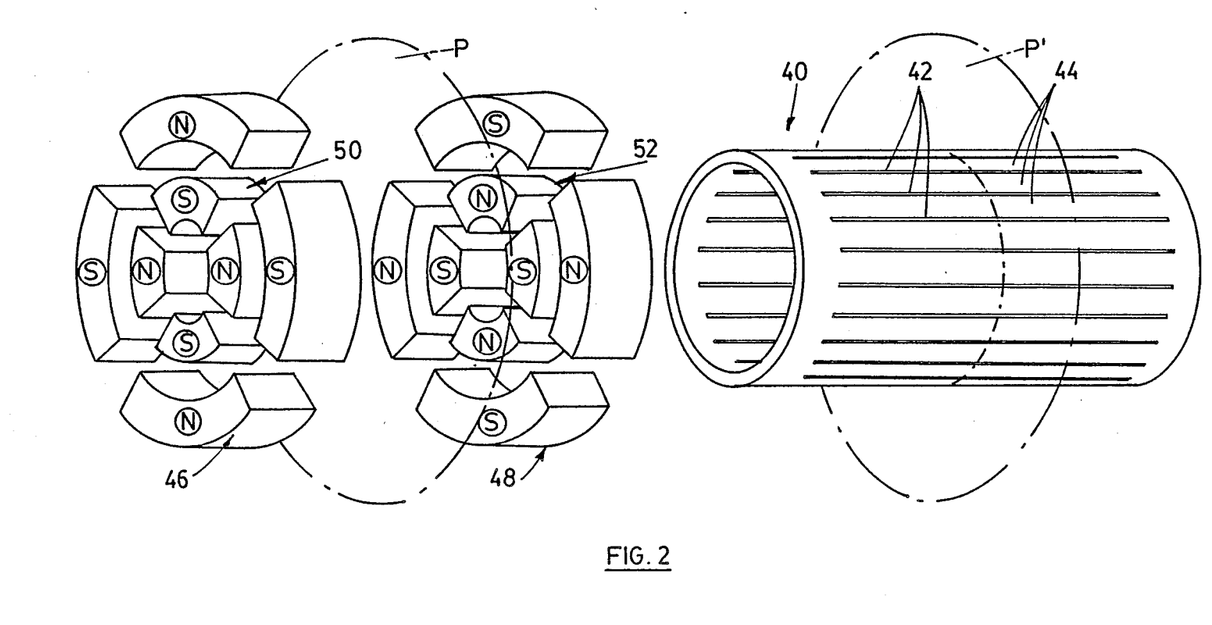
FIG. 2 indicates schematically two of the basic components and their orientation as used in this invention.

With reference now to FIG. 2 a cylinder 40 of non-magnetic high volume resistivity material is shown. That cylinder is provided with a plurality of radially extending, narrow, circumferentially spaced apart longitudinal slots 42 defining longitudinal cylinder sections 44 therebetween. As mentioned above it is necessary to induce equal and opposite EMF's within each section 44 so as to avoid crossover at each end. This is accomplished by using at least two axially spaced apart sets 46, 48 and 50, 52 of drive and driven magnets respectively, the sets 46, 50 and 48, 52 being equally spaced on each side of a plane P of reverse magnetic symmetry which coincides with the plane P' of geometric symmetry through the slotted cylinder.

As seen in FIG. 2 each set of magnets has adjacent drive magnets being of opposite polarity and adjacent driven magnets being also of opposite polarity. However it is also seen that longitudinally aligned and adjacent magnets of the sets of drive magnets and of the sets of driven magnets are of opposite polarity and this has the effect of almost cancelling the EMF's induced in each section 44 as the magnets rotate. The sets of drive magnets are mounted on a common carrier and the sets of driven magnets are mounted on another common carrier, whereby the relative orientation of the magnets will always be maintained.

Figure 3:
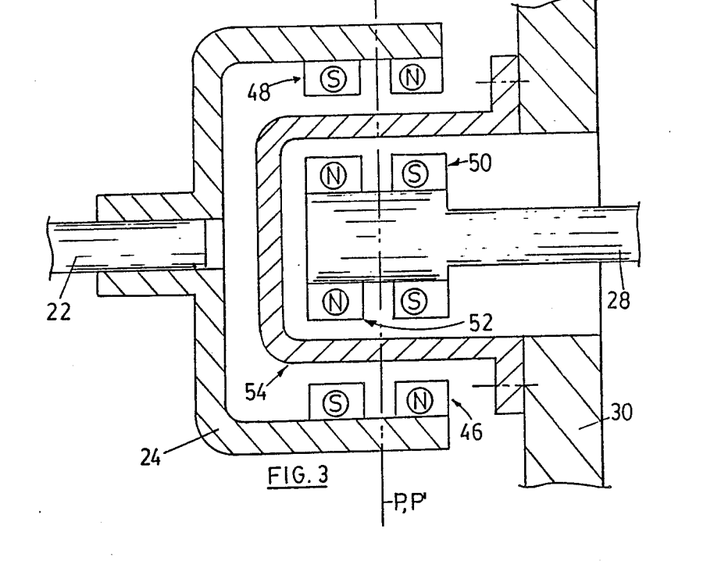
FIG. 3 indicates schematically the assembly of components used in this invention.

FIG. 3 schematically illustrates a drive system using the principles of FIG. 2. A drive shaft 22 and a carrier 24 as in FIG. 1A are shown as is a housing wall 30 and a driven or output shaft 28. However in this case the carrier member mounts axially spaced sets 46, 48 of drive magnets on opposite sides of the plane P, P' and the shaft 28 carries the axially spaced apart sets 50, 52 of driven magnets, axially aligned with the sets 46, 48 respectively. A barrier member 54, slotted like cylinder 40 and incorporating internal laminations, to be discussed hereinafter, is hermetically sealed and mounted to housing wall 30 and separates the drive and driven portions of the system.

FIGS. 4, 4A to 4C and 5 illustrate the barrier 54 in greater detail and show the important features thereof.

Figures 4, 4A, 4B, 4C:
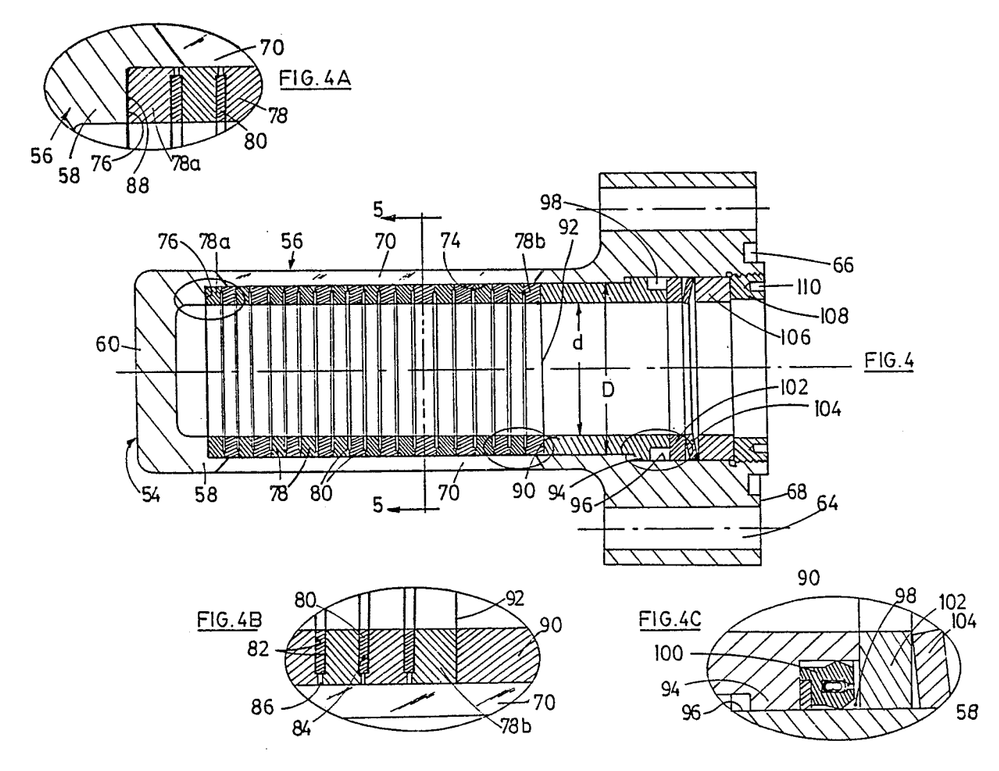
FIG. 4 is a longitudinal section through the tension cylinder of this invention, showing the laminations and the preload mechanism therein.
FIGS. 4A, 4B and 4C are enlargements of specific areas of FIG. 4.

The barrier 54 includes a tension cylinder 56 manufactured from a non-magnetic high alloy steel having high volume resistivity, such as one meeting ASME standard A 286. The cylinder 56 includes an annular wall 58, a closed wall 60 at one end and an annular flange member 62 at the other end. The flange 62 has a plurality of circumferentially spaced apart, longitudinally extending bores 64 extending therethrough each being adapted for reception of a bolt (not shown) which is threadedly engageable with a corresponding threaded bore in the housing wall 30. An annular recess or groove 66 is provided in the end face 68 of the cylinder for reception of a sealing member, such as an O-ring, (not shown) to aid in hermetically sealing the cylinder 56 to the housing wall 30.

Figure 5:
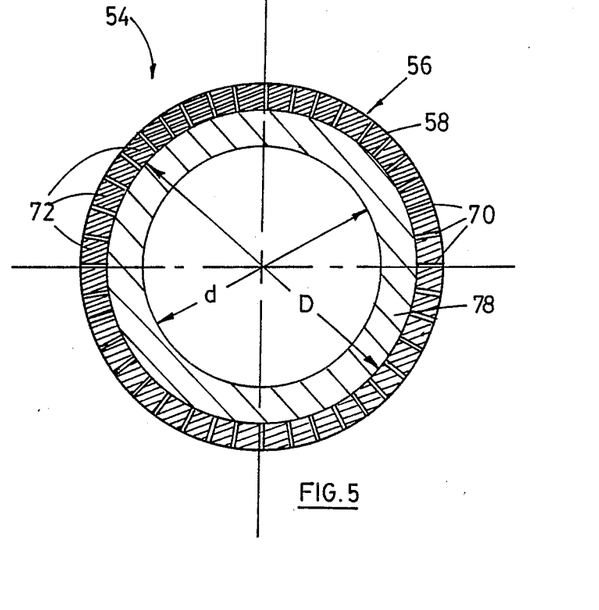
FIG. 5 is a cross-section taken on the line 5—5 of FIG. 4.

As best seen in FIG. 5 there is a plurality of narrow, radially extending, circumferentially spaced apart, slots 70 passing through the cylinder wall 58 over at least the combined length of the drive and driven magnet sets. Each pair of slots defines therebetween a longitudinal portion 72 of the cylinder wall, which portion is analogous to the portion 44 discussed with respect to FIG. 2. The slots 70 should be as narrow as possible and as practicable. For example using conventional E.D.M. or milling techniques it should be possible to produce slots in the order of 0.025 inches (0.64 mm) wide. It might be possible, using laser milling techniques to produce narrower slots.

The cylinder 56 has a longitudinally extending bore 74 of a diameter D, which bore terminates adjacent the closed end 60 at an annular shoulder 76. A plurality of annular laminations 78 constructed from a material similar to that of cylinder 56 is positioned within the cylinder 56, the outer periphery of each lamination having a close, but not necessarily a tight, fit with the wall of bore 74. The laminations 78 extend over the length of the slots 70 and have an inner diameter d which is slightly greater than the outer diameter of the driven magnet sets 50, 52.

The peripheral surface of the laminations may be coated with a thin film of varnish as an insulating precaution. However, since eddy current voltages are low and since point to point contact between the laminations an the surface of the bore 74 will random and slight it might not be necessary to insulate the laminations 78 from the cylinder 56.

The laminations are separated by electrical insulating means which could be, for example, a rigid insulating washer 80 of anodized aluminum. To ensure that there is no gas leakage in use, a thin layer of lead plating may be coated on each face of a lamination, or a thin layer of a suitable adhesive sealant could be used instead. Each lamination is provided with an annular recess 82 in the end face thereof, each recess having a depth slightly less than half the thickness of a washer 80. The recesses 82 of adjacent laminations define an annular slot 84 in which the washer 80 resides. Since each recess 82 is shallower than half the thickness of a washer there will be a minute annular gap 86 defined between adjacent laminations beyond the washer, thereby ensuring against any electrical connection between adjacent laminations.

The innermost lamination 78a will abut against the shoulder 76 and will have only one recess 82 therein. Similarly, the outermost lamination 78b will have only a single recess 82 therein. All intervening laminations 78 will have two recesses 82 therein. An insulating washer 88 can be positioned between the shoulder 76 and the innermost lamination 78a.

It is desirable to axially compress or preload the laminations towards the closed wall 60 to ensure that no leakage of high pressure gases between the laminations occurs and to better bear the radial loads imposed by high pressure gases. A preload in the order of 2,000 pounds would probably be sufficient.

Preloading is achieved by various elements inserted into the open end of cylinder 56. The first such element is an annular piston member 90 which abuts the outermost lamination 78b, perhaps with an insulating washer 92 therebetween. The piston member 90 is received within bore 74 and has an internal diameter the same as that of the laminations. The piston member near its outer end is provided with a peripheral flange 94 received in an enlarged counterbore 96 of the cylinder, the flange 94 defining with the counterbore an annular recess or groove 98 that is adapted to receive an annular high pressure seal 100 such as is commercially available from BAL-SEAL ENG. COMPANY under Catalogue No. H506-GC-332 (see FIG. 4C). An annular thrust washer 102 is provided in counterbore 96 to abut the outer end face of piston member 90 and an annular spring member 104, such as a Belleville spring, is provided to abut against thrust washer 102. A second thrust washer 106 abuts the spring member 104 and an externally threaded annular nut 108 is threaded into the counterbore 96 so as to bear against thrust washer 106. Nut 108 has oppositely positioned counterbores 110 to receive an appropriate tool used to rotate the nut 108 and thereby increase or decrease the axial force imposed on the laminations via the piston member 90, the thrust washer 102, the spring member 104, the thrust washer 106 and the nut 108.

It is important to note that the piston member 90 has a larger effective pressure area, due to the peripheral flange 94, relative to the sealing facial area of the laminations. This difference between the two areas ensures that when the barrier is subjected to high internal pressure the laminations and their washers will always be tightly clamped together with a force greater than the pressure forces acting to separate them.

Attention may now be directed to FIGS. 6 to 10 which illustrate a complete low loss magnetic drive system incorporating the significant features of this invention.

Figure 6:
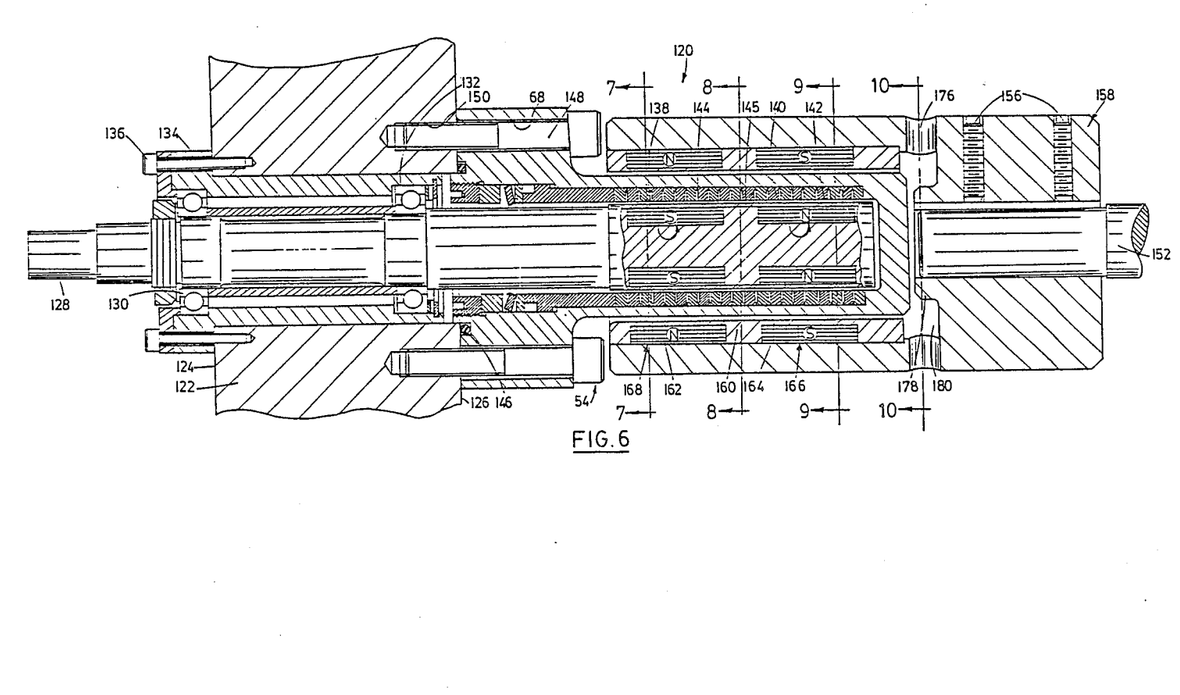
FIG. 6 is a longitudinal section taken through a practical example of a low loss magnetic drive constructed in accordance with the present invention.

With reference to FIG. 6 it will be seen that a low loss magnetic drive system 120 of this invention is mounted on a wall 122 of a housing containing rotary apparatus to be driven by the system. It is understood that during operation pressures inside the housing, adjacent inside surface 124, could be in the order of tens of thousands of p.s.i. while pressure outside the housing, adjacent outer surface 126, will probably be atmospheric.

The system of this invention includes an output shaft 128 bearingly supported as it passes through wall 122 by bearings 130, 132 held in a bushing 134 which is bolted to the inner surface 124 by bolts or machine screws 136. The bearing mounting per se does not form a part of this invention as it can be accomplished in any suitable manner depending on the particular circumstances encountered. Hence it is not deemed necessary to describe all components of the bearing system as illustrated. The significant aspects of the present invention reside externally of the housing wall 122.

Figure 7:
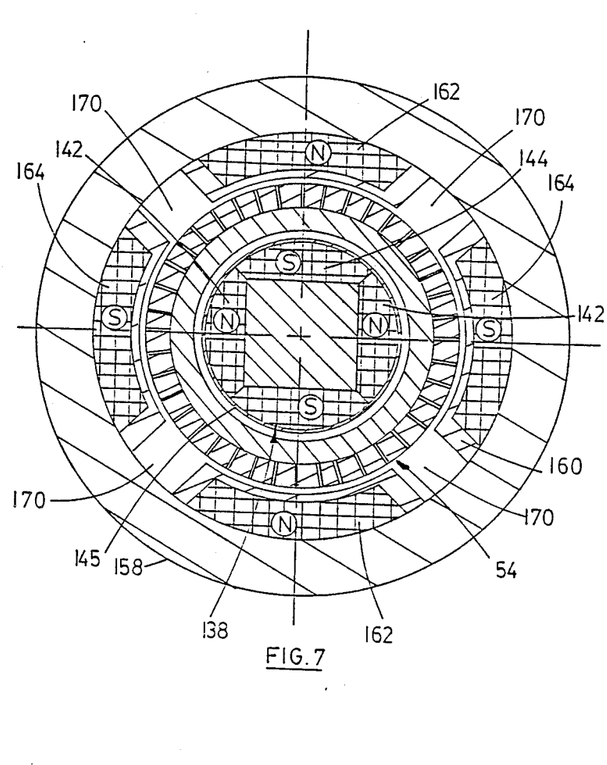
FIGS. 7, 8, 9 and 10 are, respectively, enlarged-scale cross-sections taken on the lines 7—7, 8—8, 9—9 and 10—10 of FIG. 6.

At its outer end the shaft 128 carries at least two sets 138, 140 of driven magnets arrayed and mounted to the shaft as shown in FIG. 7. That figure shows the magnets of the set 138 with circumferentially adjacent magnets 142, 144 being of opposite polarity. As shown the shaft 128 is squared off at the magnet location, the magnets 142, 144 are adhered to the shaft and the outer surface of the magnets is ground so as to achieve a circular profile.

Figure 9:
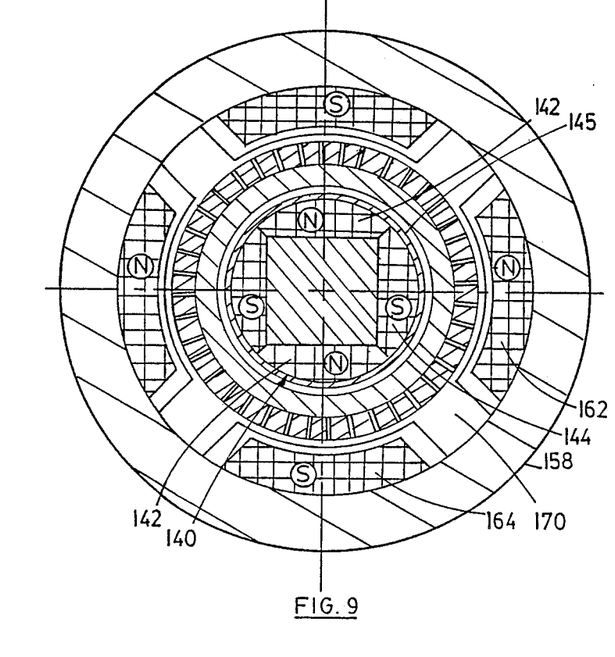

The magnets of the second set 140 are located outboard of the magnets of the first set 138 and the longitudinally adjacent magnets of the two sets are of opposite polarity (see FIG. 9). In comparing the sections through the sets of driven magnets as seen in FIGS. 7 and 9 it will be seen that the set 140 is angularly offset from the set 138 by 90°. The magnets of set 140 ar secured to the shaft 128 in the same manner as the magnets of the set 138. A non-magnetic sleeve 145 slides over and covers the magnet sets 138, 140 for protection thereof.

A hyperbaric barrier 54 constructed as previously described with respect to FIGS. 4, 4A, 4B, 4C and 5 is positioned over the shaft 128 and the driven magnet sets 138, 140 so as to encircle those magnets and the portion of the shaft which protrudes from the housing wall 122. An O-ring 146 is provided in annular groove 66 and a bolt or machine screw 148 is passed through each bore 68 for engagement with a corresponding threaded bore 150 in the wall 122. When the bolt 148 are tightened the end face 68 of cylinder 56 will abut the exterior surface 126 of wall 122 and the O-ring 146 will prevent the escape the gases there past.

An external drive for the system is provided by a high R.P.M. electric motor (not shown) which has an output directly coupled to the system of the invention, as by way of an input shaft 152. That shaft is keyed, as by key 154 held by set screws 156, to a cup-shaped carrier member 158. The carrier member mounts the drive magnets as discussed hereinbelow and may be made of magnetic or non-magnetic material depending upon whether the drive magnets are installed in a non-magnetic subcarrier or directly within the carrier. It is simpler and less expensive to use a subcarrier and it is that construction which will be described.

The subcarrier 160 is formed from a non-magnetic material and is initially formed as a cylinder having a wall thickness greater than that of the driven magnets 162, 164, which magnets are arcuate in configuration. The cylinder of the subcarrier 160 is milled to receive the drive magnets in two axially spaced apart sets 166, 168 having the same axial spacing as driven magnet sets 138, 140. The drive magnets are glued into the slots milled in the outer surface of the subcarrier with circumferentially adjacent magnets 162, 164 within each set being of opposite polarity and with longitudinally adjacent magnets of the two sets also being of opposite polarity, just as with the driven magnets. The outer periphery of the subcarrier with the drive magnets secured therein is then ground so that the subcarrier can slide smoothly into the cup-shaped carrier member 158 to take a position as shown in FIG. 6.

Figure 8:
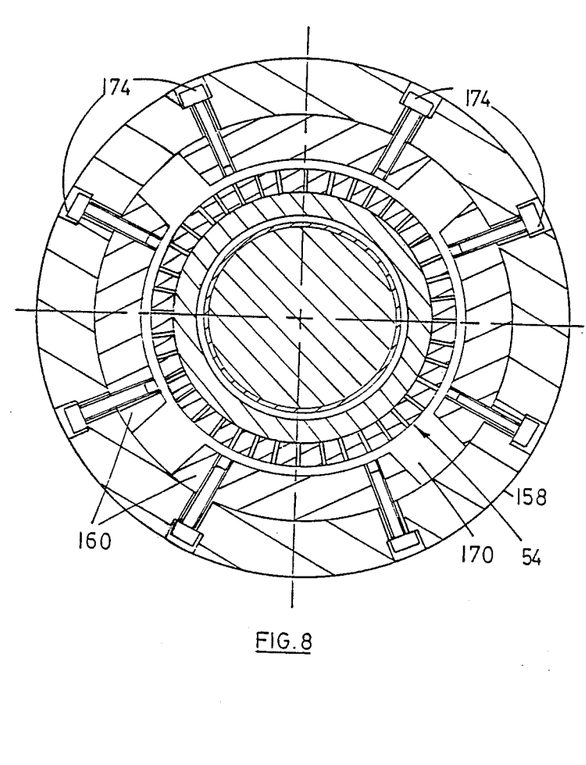
Figure 10:
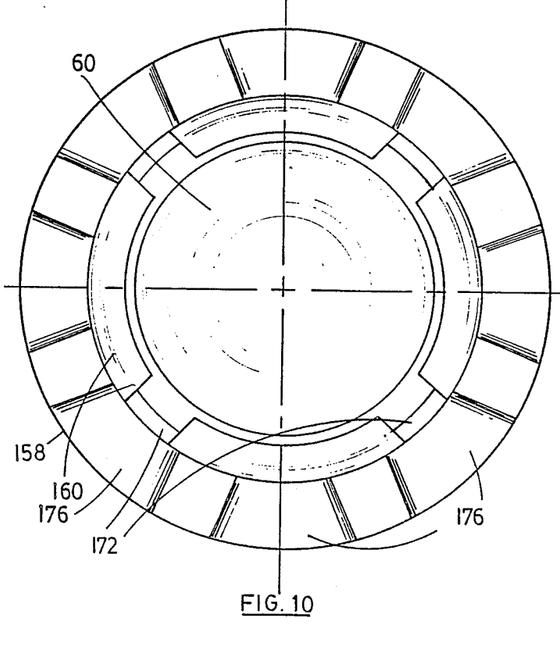

As seen in FIGS. 7 to 10 the subcarrier has been milled longitudinally between adjacent magnets to create longitudinally extending slots 170. As seen in FIG. 10 the slots 170 do not extend all the way through the wall of the subcarrier 160 over the full length thereof. A thin arcuate web 172 is maintained at the inner end of the subcarrier bridging the slots 170 and keeping the legs of the subcarrier, each mounting a pair of longitudinally spaced apart drive magnets of opposite polarity, in their correct circumferential orientation while the subcarrier 160 is inserted into the carrier member 158. Once the subcarrier 160 is in place a plurality of set-screws 174 are inserted through the wall of the carrier member for threaded engagement with the subcarrier at each end thereof and between the sets 166, 168 of drive magnets (FIG. 8). The subcarrier 160 is thus held securely within the carrier member.

It is of course understood that the drive magnets 162, 164 could be secured within the carrier member in other ways without departing from the spirit of this invention.

Finally, it is noted that the carrier member 158 is provided with a plurality of radially extending apertures or slots 176 through the wall thereof adjacent the closed end 178 thereof. The apertures 176 communicate with the interior 180 of the carrier member and serve to extract air which is drawn along the barrier 54 through the slots 170 and which helps to cool the barrier 54. In use the carrier member 158 encircles the barrier 54 and the sets 166, 168 of drive magnets are axially aligned with the sets 138, 140 respectively of driven magnets. Rotation of the carrier member 158 by the drive motor results in rotation of the output shaft 12 through magnetic interaction between the drive and the driven magnets. Rotation at high speed generates eddy currents within the barrier 54 but those currents are reduced dramatically due to the longitudinal slots in the cylinder 56 and due to essentially cancelling EMF's produced by the sets of magnets being of opposite polarity. Cooling air drawn along the barrier 54 through slots 170 and discharged through apertures 176 will also help keep heat generated within the system to an acceptable level. The laminations 78 serve to protect the cylinder 56 from internal pressure forces and by preloading the laminations and ensuring a larger face area on the preload side of piston 90 there will be no tendency for the laminations to separate even at extremely high internal pressures.

By utilizing a magnetic drive system as disclosed herein it is possible to directly drive the carrier member by the drive motor and consequently greater rotational speeds can be achieved than with presently-available equipment. This means as well that smaller pumps or other rotary equipment can be used to achieve the same effects as were available with larger equipment at lower speeds. Consequently the cost of such rotary equipment can be reduced considerably. By eliminating tie bolts the hyperbaric barrier is made simpler and safer and a more compact drive system results. By providing longitudinal "laminations" in the cylinder and arranging the magnets as indicating the effects of eddy currents are dramatically small and much less heat is generated than would otherwise be the case. Thus the drive system of the present invention clearly represents a viable system for those situations calling for high horsepower drives and/or in which extremely high pressures will be encountered.

The foregoing describes one form of putting the principles of the present invention into effect. Undoubtedly a skilled workman could alter specific constructions without departing from the spirit of the invention. Thus the scope of protection to be afforded this invention is to be determined from the claims appended hereto.

The embodiments of the invention in which an exclusive property or privilege is claimed are defined as follows:

1. A low loss synchronous magnetic drive system comprising:
   (a) a drive motor;
   (b) a cup-shaped carrier member coupled to said drive motor for rotation on a longitudinal axis, said member mounting therein at least two axially spaced apart sets of drive magnets, circumferentially adjacent magnets of each set being of opposite polarity and each magnet of one set being longitudinally aligned with a magnet of opposite polarity within the axially adjacent set;
   (c) a driven shaft rotatable on said axis, said shaft carrying thereon at least two axially spaced apart sets of driven magnets, each set being axially aligned with a corresponding set of said drive magnets, circumferentially adjacent driven magnets of each set being of opposite polarity, each driven magnet of one set being longitudinally aligned with a driven magnet of opposite polarity within the axially adjacent set;
   (d) tension cylinder means circumferentially interposed between said sets of drive and driven magnets, said cylinder means including a plurality of narrow, circumferentially equally spaced slots extending radially though the wall of said cylinder means over at least the combined length of said sets of driven magnets, said cylinder means having a closed wall at one end between said shaft and said carrier means and means at the other end for hermetically mounting said cylinder means to a housing containing apparatus to be driven by said shaft; and
   (e) a plurality of axially adjacent annular laminations electrically insulated from each other and positioned within said cylinder means so as to encircle said driven magnets over the length thereof;
   at least said driven shaft, said cylinder means and said laminations being constructed of non-magnetic materials having high tensile strength and high electrical volume resistivity.

2. The system of claim 1 including:
   (f) means for providing an axial pre-load force against said laminations in the direction of said closed wall of said cylinder means.

3. The system of claim 2 wherein said laminations are insulated from each other by a thin rigid annular washer of an insulating material contained within an annular slot defined by complementary annular recesses formed in adjacent side walls of adjacent laminations, the thickness of each washer being slightly greater than twice the depth of each recess whereby with an insulating washer positioned within an annular slot there will be no contact between adjacent laminations radially beyond the slot.

4. The system of claim 3 wherein each insulating annular washer is formed from anodized aluminum.

5. The system of claim 4 wherein a thin layer of lead is plated onto axially adjacent surfaces of such laminations.

6. The system of claim 4 wherein a thin layer of an adhesive sealant is bonded to axially adjacent surfaces of such laminations.

7. The system of claim 3 wherein said means for providing an axial pre-load force on said laminations comprises an abutment shoulder within said cylinder means against which the axially innermost one of said laminations can abut; an annular piston member received within said cylinder means in abutment at one end with the axially outermost one of said laminations; a first annular thrust washer in abutment with the other end of said piston member; an annular spring member positioned between said first thrust washer and second annular thrust washer received within said cylinder means; and an externally threaded nut member threadedly engageable with internal threads within said cylinder means for applying the pre-load force through said thrust washers, spring member and piston member against said outermost lamination.

8. The system of claim 7 wherein said piston member includes a radially outwardly extending peripheral flange adjacent the outer end thereof, said flange defining a radially outwardly opening annular recess in the adjacent end wall of said piston member within which resides an annular high pressure sealing member.

9. The system of claim 8 wherein said means for mounting said cylinder means comprises an annular flange member at said other end of the cylinder means, an annular recess within the end face of said cylinder means for receiving an annular sealing member, and a plurality of circumferentially spaced, longitudinally extending bores through said flange member, each bore being adapted to receive a bolt which is threadedly engageable with a corresponding bore in said housing.

10. The system of claim 7 wherein said carrier member includes an open end, a closed end and a plurality of radially extending apertures extending through the wall thereof and communicating with the interior of the carrier adjacent the closed end, said apertures serving to exhaust cooling air drawn into the open end between said carrier member and said cylinder means as said carrier member rotates.

11. The system of claim 10 including a longitudinal slot extending from the open end to the closed end of said carrier member between circumferentially adjacent magnets of said sets of drive magnets, such slots serving to transport cooling air from the open end towards the closed end of said carrier member.

* * * * *